United States Patent [19]
Ferlier et al.

[11] Patent Number: 5,111,523
[45] Date of Patent: May 5, 1992

[54] LASER-MARKABLE OPTICAL FIBER OR ELECTRIC CABLE

[75] Inventors: Jean-Pierre Ferlier, Yerres; Michel Basly, Juvisy sur Orge, both of France

[73] Assignee: Filotex, Draveil, France

[21] Appl. No.: 637,235

[22] Filed: Jan. 3, 1991

[30] Foreign Application Priority Data

Jan. 3, 1990 [FR] France ............... 90 00030

[51] Int. Cl.$^5$ .......... G02B 6/44; B23K 26/14; H01B 7/36
[52] U.S. Cl. ............... 385/100; 385/147; 219/121.67; 219/121.68; 219/121.7; 174/112; 430/945; 430/947
[58] Field of Search .......... 350/96.23, 96.33; 372/109; 430/945, 947; 174/112; 219/121.67, 121.68, 121.7; 338/214; 385/100, 102, 128, 127, 147

[56] References Cited

U.S. PATENT DOCUMENTS

| | | | |
|---|---|---|---|
| 4,370,542 | 1/1983 | Mills et al. | 219/121.68 X |
| 4,443,684 | 4/1984 | Sakuragi et al. | 219/121.68 X |
| 4,626,652 | 12/1986 | Bjork et al. | 219/121.68 X |
| 4,808,966 | 2/1989 | Ferlier et al. | 219/121.68 X |
| 4,915,981 | 4/1990 | Traskos et al. | 219/121.7 |
| 4,997,994 | 3/1991 | Andrews et al. | 219/121.68 X |

FOREIGN PATENT DOCUMENTS

| | | | |
|---|---|---|---|
| 0190997 | 8/1986 | European Pat. Off. | 350/96.23 X |
| 0329884 | 8/1989 | European Pat. Off. | 350/96.23 X |
| 2617325 | 12/1988 | France | 350/96.23 X |

Primary Examiner—Brian Healy
Attorney, Agent, or Firm—Sughrue, Mion, Zinn, Macpeak & Seas

[57] ABSTRACT

A laser-markable cable, in particular an optical fiber cable, having an outer protective layer of varnish comprising an outer layer (14) provided with a pigment and sublimable by means of a first type of laser, and an inner underlayer (13) of a contrasting color relative to that of the outer layer. The cable is characterized by the fact that said outer layer (14) is also modifiable in color by a second type of laser without being destroyed in thickness, thereby providing a second possible method of marking.

5 Claims, 1 Drawing Sheet

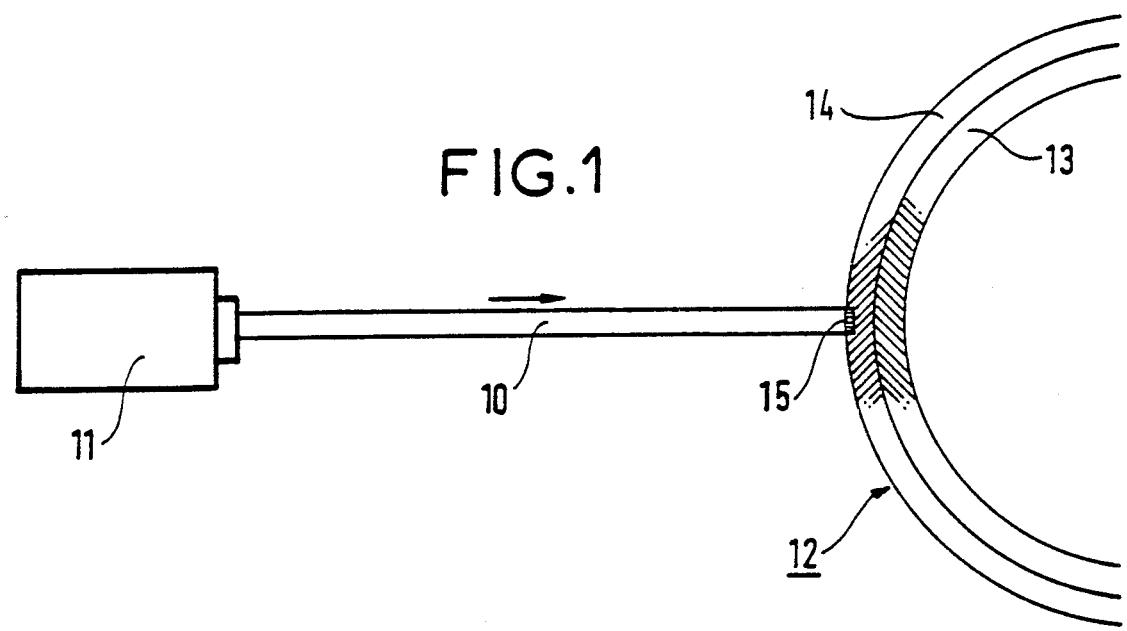
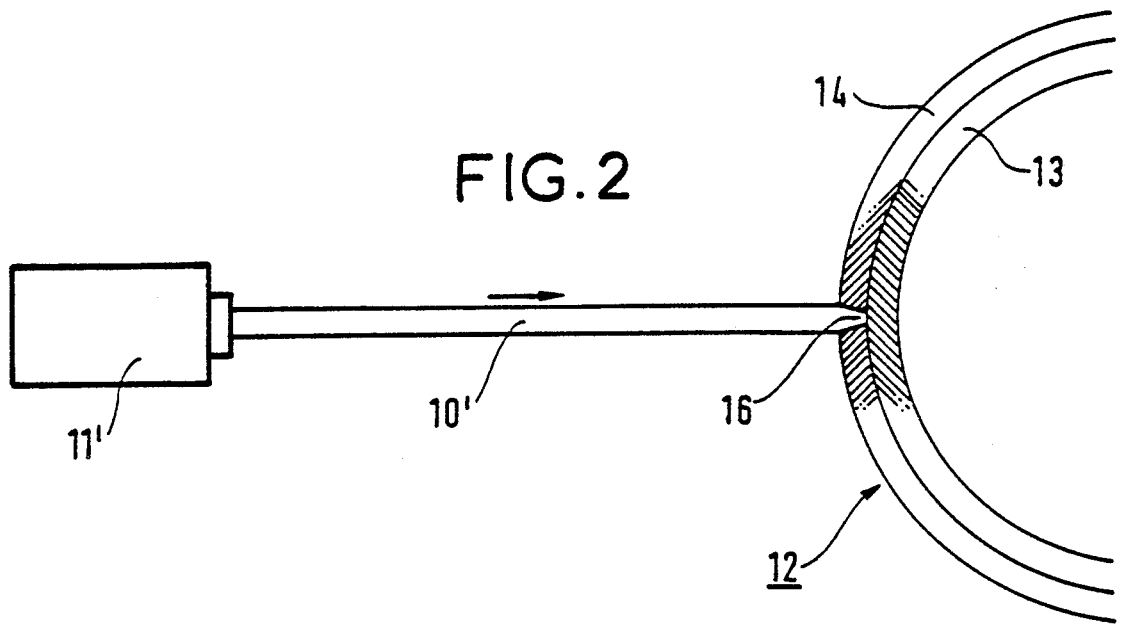

LASER-MARKABLE OPTICAL FIBER OR ELECTRIC CABLE

FIELD OF THE INVENTION

The present invention relates to a laser-markable, electrical or optical-fiber cable having an outer layer formed by a varnish enabling marking to be performed, the varnish comprising an inner underlayer provided with a pigment which confers a dark color thereto and an outer layer provided with a pigment which confers a light color thereto, the outer layer being sublimable under the effect of laser radiation.

BACKGROUND OF THE INVENTION

The Applicants' French patent application FR-A-2 602 904 relates to a laser-markable electrical cable including a thin outer layer enabling marking to be performed, the outer layer being of a color that contrasts with that of an underlayer which is absorbant at the wavelength of a laser ray, said outer layer being destroyed throughout its thickness during marking by a laser ray, thereby revealing the underlayer.

However, in some cases it is desirable to be able to place markings on a cable by means of different types of laser, which markings should be easily seen on the cable.

An object of the present invention is to provide a cable capable of being marked by different types of laser in such a manner as to cause easily-interpreted distinct markings to appear thereon.

SUMMARY OF THE INVENTION

The cable of the present invention is characterized in that said outer layer is also capable of having its color modified by other laser radiation of a second type without destroying the thickness of said outer layer, thereby providing a second possible method of marking said cable.

It preferably satisfies at least one of the following characteristics:

laser radiation suitable for modifying only the color of a portion of the thickness of the outer layer (excimer, frequency-tripled YAG, copper, frequency-doubled YAG) differs from laser radiation that sublimes said layer (e.g. YAG laser, carbon dioxide laser) in wavelength and/or energy and/or pulse duration;

the pigment of the outer layer is constituted by a mixture in weight percentages relative to the weight of dry binder comprising 2% to 10% titanium dioxide and 5% to 30% of at least one inorganic compound of the group constituted by: zinc sulfide, white lead, antimony oxide, neutral or basic lead silicate, zinc oxide, molybdenum trioxide, cadmium sulfide, and calcium and magnesium carbonate.

Laser radiation may be used in the ultraviolet, in the visible, or in the infrared. When using ultraviolet radiation, an excimer laser may be used, e.g. a zenon/chlorine gas laser (0.308 $\mu$m), a krypton/fluorine gas laser (0.248 $\mu$m) or a frequency-tripled YAG laser giving a frequency of 0.35 $\mu$m. For radiation in the visible, it is possible to use a copper vapor laser (0.51 $\mu$m and 0.58 $\mu$m) or a frequency doubled YAG laser (0.53 $\mu$m). For radiation in the near infrared, a YAG laser may be used with a frequency of 1.06 $\mu$m. For radiation in the infrared, a carbon dioxide laser may be used with a frequency of 10.6 $\mu$m.

Suitable varnishes include, in particular, fluorocarbon varnishes such as polytetrafluoroethylene, copolymers of ethlene and tetrafluoroethylene, copolymers of tetrafluoroethylene and hexafluoropropylene, and vinylidene polyfluoride resins, or non-fluorocarbon varnishes such as, polyurethane varnishes, aromatic polyamide varnishes, polyimide varnishes, etc.

The inner underlayer may, for example, be made of polytetrafluoroethylene such as "Teflon 30N" made by Dupont de Nemours using an aqueous dispersion, or it may be an aromatic polyamide such as "Imitec 302" made by Imitec from a solution in N-methyl pyrrolidone. Its minimum thickness is 15 $\mu$m to 25 $\mu$m.

The dark pigment in said inner underlayer may be a dark brown pigment such as the pigment "Marron Sicopal K2795" made by BASF, or a black pigment such as the pigment "FA 2306" made by Ferro, or a combination of such pigments.

The outer layer may have the same chemical nature as the inner underlayer, or it may have a different chemical nature.

Its thickness must nevertheless be not less than 5 $\mu$m in order to enable its covering power to mask the color of the underlayer in a contrasting color. Its thickness must be no greater than 25 $\mu$m so that laser radiation causing the outer layer to sublime can reveal the inner underlayer. Its pigment is preferably constituted by associating a first pigment constituting 2% to 10% relative to the weight of dry binder and constituted by titanium dioxide in its anatase or rutile forms, e.g. the pigment "Kronos RN 59" made by NL Chemicals, and a second pigment occupying 5% to 30% by weight relative to the weight of dry binder, and constituted by at least one of the following pigments: zinc sulfide, white lead, antimony oxide, neutral or basic lead silicate, zinc oxide, molybdenum trioxide, cadmium sulfide, and calcium and magnesium carbonate. Other, colored pigments may be added in small quantities (in the range 0.1% to 5% dry binder) so as to obtain pastel tints.

BRIEF DESCRIPTION OF THE DRAWINGS

The marking of a cable by leser in accordance with the invention is described below by way of example and with reference to the figures of the accompanying drawing.

FIG. 1 shows the outer layer being marked by having its color modified without being destroyed.

FIG. 2 shows how marking is possible by subliming the outer layer, thereby revealing the inner underlayer of contrasting color, with this method of marking being the prior art method mentioned above.

DESCRIPTION OF THE PREFERRED EMBODIMENTS

In FIG. 1, a laser beam 10 from a laser source 11 is directed onto the surface of an electric cable 12 provided with an outer layer of varnish constituted by an inner under layer 13 and by an outer layer 14. The thickness of the outer layer is greater than 5 $\mu$m and less than 25 $\mu$m, and it is transformed superficially only at the point of impact so as to leave a mark 15 which is darker than the remainder of said underlayer by virtue of its pigment being transformed. A first marking is obtained in this way.

FIG. 2 shows marking by subliming the outer layer 14. The laser beam 10' from a different laser source 11' sublimes the entire thickness of the outer layer at its point of impact 16, thereby revealing the inner underlayer 13 which reflects the laser radiation.

These two sources 11 and 11' belong to the two types of source defined above. The same cable may be marked in either of the two possible methods by using a laser source of the first type or of the second type.

We claim:

1. A laser-markable cable having an outer protective layer of varnish constituted by an outer layer (14) provided with a pigment imparting a base color thereto, the outer layer being sublimable by laser radiation of a first type, the varnish also being formed by an inner underlayer (13) of a contrasting color relative to the base color of said outer layer, thereby providing a first method of marking said cable by subliming the outer layer at the point of impact of laser radiation of said first type, and wherein said outer layer (14) is of a material capable of having its color modified by laser radiation (10) of a second type (11) without destroying the thickness of said outer layer (14), thereby providing a second method of marking said cable.

2. A cable according to claim 1, characterized in that said outer layer is sublimable and is modifiable in color by laser radiation (10', 10) of said first and second types which differ in wavelength and/or energy and/or pulse duration.

3. A laser-markable cable having an outer protective layer of varnish constituted by an outer layer (14) provided with a pigment imparting a base color thereto, the outer layer being sublimable by laser radiation of a first type, the varnish also being formed by an inner underlayer (13) of a contrasting color relative to the base color of said outer layer, thereby providing a first method of marking said cable by subliming the outer layer at the point of impact of laser radiation of said first type, and wherein cable said outer layer (14) is of a material capable of having its color modified by laser radiation (10) of a second type (11) without destroying the thickness of said outer layer (14), thereby providing a second method of marking said cable, wherein the pigment of the outer layer is constituted by a mixture in weight percentages relative to the weight of dry binder comprising 2% to 10% titanium dioxide and 5% to 30% of at least one inorganic compound of the group consisting of: zinc sulfide, white lead, antimony oxide, neutral or basic lead silicate, zinc oxide, molybdenum trioxide, cadmium sulfide, and calcium and magnesium carbonate.

4. A cable according to claim 1, with characterized in that the varnishes of the inner underlayer and of the outer layer are fluorocarbon varnishes (PTFE, FEP, ETFE, PVDF, etc. . . . ) or non-fluorocarbon varnishes (polyimide, polyamide, polyurethane, etc. . . . ).

5. A cable according to claim 1, characterized in that the varnishes of the inner underlayer and of the outer layer are of different chemical composition.

* * * * *